(12) United States Patent
Elliott et al.

(10) Patent No.: US 10,838,477 B2
(45) Date of Patent: Nov. 17, 2020

(54) METHOD AND APPARATUS FOR INITIALIZING A POWER DISTRIBUTION CIRCUIT

(71) Applicant: GE Aviation Systems Limited, Cheltenham (GB)

(72) Inventors: David Alan Elliott, Gloucester (GB); James Angelo Elder, Cheltenham (GB); Peter James Handy, Cheltenham (GB); Denis Vaughan Weale, Bristol (GB)

(73) Assignee: GE Aviation Systems Limited, Cheltenham (GB)

( * ) Notice: Subject to any disclaimer, the term of this patent is extended or adjusted under 35 U.S.C. 154(b) by 116 days.

(21) Appl. No.: 16/174,331

(22) Filed: Oct. 30, 2018

(65) Prior Publication Data

US 2019/0163249 A1 May 30, 2019

(30) Foreign Application Priority Data

Nov. 24, 2017 (GB) .................................. 1719536.3

(51) Int. Cl.
*G06F 1/26* (2006.01)
*H02J 4/00* (2006.01)
*B64D 41/00* (2006.01)

(52) U.S. Cl.
CPC ............... *G06F 1/266* (2013.01); *H02J 4/00* (2013.01); *B64D 41/00* (2013.01); *B64D 2221/00* (2013.01)

(58) Field of Classification Search
CPC . G06F 1/266; H02J 4/00; B64D 41/00; B64D 2221/00
See application file for complete search history.

(56) References Cited

U.S. PATENT DOCUMENTS

| 5,752,047 | A | * | 5/1998 | Darty ........................ G06F 1/26 361/2 |
|---|---|---|---|---|
| 6,664,656 | B2 | | 12/2003 | Bernier |
| 7,007,179 | B2 | | 2/2006 | Mares |
| 7,228,363 | B1 | | 6/2007 | Wehrle |
| 7,721,079 | B2 | | 5/2010 | Wehrle |
| 7,774,511 | B2 | | 8/2010 | Ariel |
| 7,884,495 | B2 | | 2/2011 | Kojori |

(Continued)

FOREIGN PATENT DOCUMENTS

| EP | 0898442 A1 | 8/1997 |
| WO | 9204675 A1 | 3/1992 |

OTHER PUBLICATIONS

GB Search Report and Written Opinion dated May 22, 2018 which was issued in connection with GB patent application No. GB1719536.3 which was filed on Nov. 24, 2017.

*Primary Examiner* — Jaweed A Abbaszadeh
*Assistant Examiner* — Hyun Soo Kim
(74) *Attorney, Agent, or Firm* — McGarry Bair PC

(57) ABSTRACT

A power distribution node and method of associating a permanent identity includes a node communication input port and a node communication output port, a first power controller having a first switchable element and a first controller module configured to operate the first switchable element, the first controller module having a first communication input port connected with the node communication input port and a first communication output port, and a second power controller having a second switchable element.

18 Claims, 7 Drawing Sheets

(56) References Cited

U.S. PATENT DOCUMENTS

| | | |
|---|---|---|
| 9,033,215 B1 | 5/2015 | West |
| 9,271,423 B2 | 2/2016 | Vaziri |
| 2006/0071559 A1 | 4/2006 | Hanson |
| 2007/0260764 A1 | 11/2007 | Garber |
| 2008/0275975 A1* | 11/2008 | Pandey .................. H04L 49/40 709/223 |
| 2010/0177335 A1* | 7/2010 | Oh ..................... G03G 15/6552 358/1.13 |
| 2010/0185784 A1 | 7/2010 | De Nie |
| 2010/0280786 A1* | 11/2010 | Gorbold ............. G06F 12/0661 702/120 |
| 2012/0230110 A1* | 9/2012 | Nobunaga ................ G11C 5/04 365/185.18 |
| 2018/0276154 A1* | 9/2018 | Hansing ............. G06F 13/4068 |

* cited by examiner

METHOD AND APPARATUS FOR INITIALIZING A POWER DISTRIBUTION CIRCUIT

BACKGROUND OF THE INVENTION

Electrical power systems, such as those found in an aircraft power distribution system, employ power generating systems or power sources, such as generators, for generating electricity for powering the systems and subsystems of the aircraft. As the electricity traverses electrical bus bars to deliver power from power sources to electrical loads, power distribution nodes dispersed throughout the power system ensure the power delivered to the electrical loads meets the designed power criteria for the loads. Power distribution nodes can, for instance, further provide step-up or step-down power conversion, direct current (DC) to alternating current (AC) power conversion or AC to DC power conversion, or switching operations to selectively enable or disable the delivery of power to particular electrical loads, depending on, for example, available power distribution supply, criticality of electrical load functionality, or aircraft mode of operation, such as take-off, cruise, or ground operations. In some configurations, the power distribution nodes can include electrical power components disposed on printed circuit boards.

BRIEF DESCRIPTION OF THE INVENTION

In one aspect, the present disclosure relates to a power distribution node including a node communication input port and a node communication output port, a first power controller having a first switchable element and a first controller module configured to operate the first switchable element, the first controller module having a first communication input port connected with the node communication input port and a first communication output port, and a second power controller having a second switchable element and a second controller module configured to operate the second switchable element, the second controller module having a second communication input port connected with the first communication output port and a second communication output port connected with the node communication output port. The first and second power controllers are adapted to be identified with a permanent identity by way of a transmittable data signal receivable at the node communication input port and sequentially received by the first and second power controllers.

In another aspect, the present disclosure relates to a method of associating a permanent identity with a set of power switches, the method including: A) receiving an identifying data signal to a communications input of a power distribution node including the set of power switches and respective set of controller modules arranged in a communication sequence, B) supplying the identifying data signal to one of the set of controller modules, C) permanently identifying the one of the set of controller modules with a unique identity, and D) repeating steps B) and C) sequentially in the next of the set of controller modules in the communication sequence.

In yet another aspect, the present disclosure relates to a power distribution node programming assembly including a node communication input port, and a node communication output port, a power distribution node having a set of power controllers, each power controller including a switch controller module having a communication input port and communication output port, wherein the set of power controllers are sequentially arranged such that the node communication input port is connected with the first of the sequentially arranged switch controller modules, and each successive switch controller module input communication input port is connected with the communication output port of the preceding switch controller module, and wherein the communication output port last of the sequentially arranged switch controller modules is connected with the node communication output port, and a programming controller module configured to generate a programming data signal supplied to the node communication input port, wherein the programming data signal is configured to sequentially identify each of the set of power controllers with a permanent identity.

DESCRIPTION OF EMBODIMENTS OF THE INVENTION

Figure 1:
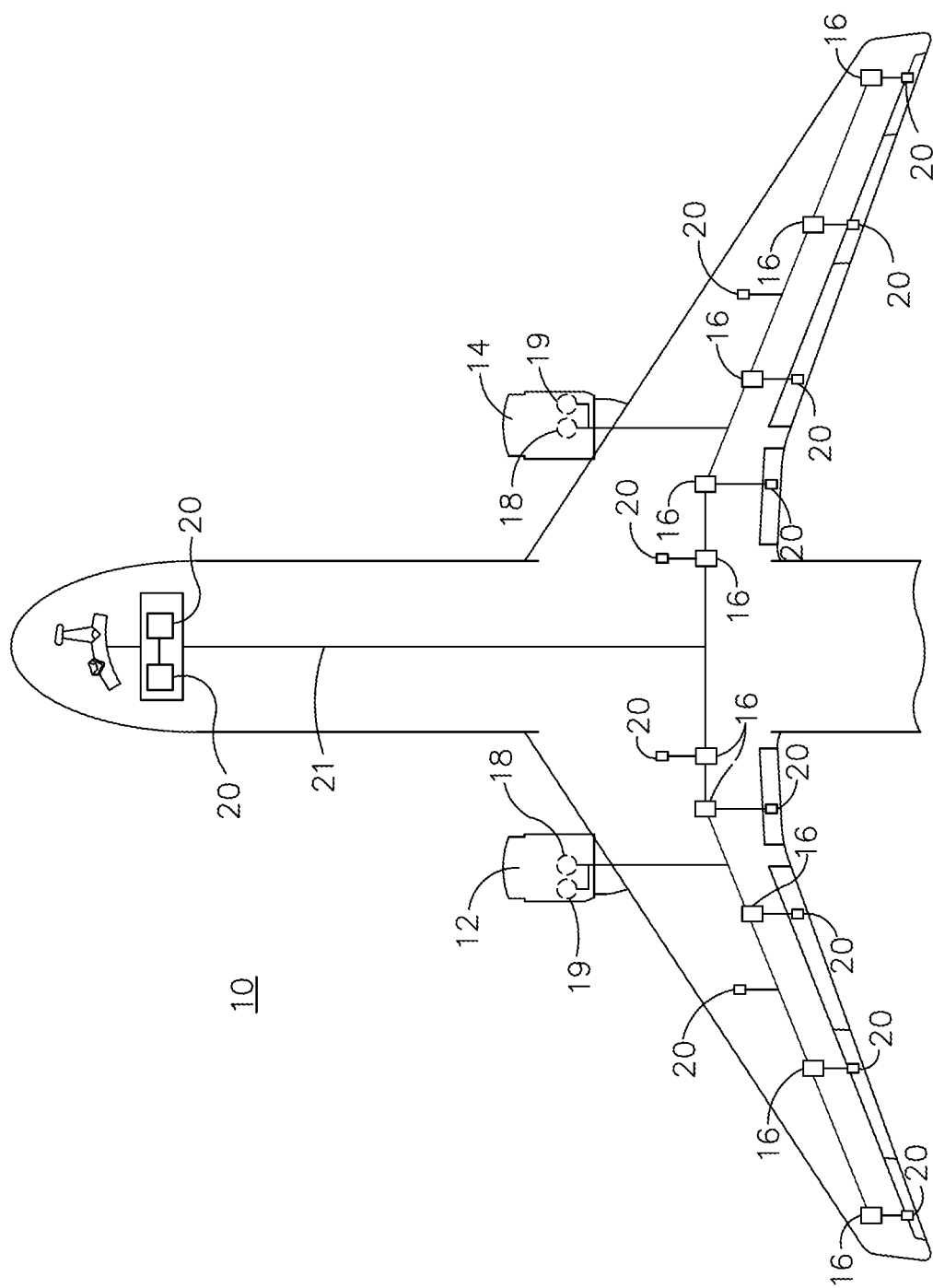
FIG. 1 is a top down schematic view of the aircraft and power distribution system in accordance with various aspects described herein.

The described aspects of the present disclosure are directed to an electrical power distribution system or power distribution node for an aircraft, which enables production and distribution of electrical power from a turbine engine, such as a gas turbine engine driven generator, to the electrical loads of the aircraft. It will be understood that while aspects of the disclosure are shown in or intended for in-situ use of an aircraft environment, the disclosure is not so limited and has general application to electrical power systems in non-aircraft applications, such as other mobile applications and non-mobile industrial, commercial, and residential applications. For example, while this description is directed toward a power system architecture in an aircraft, aspects of the disclosure can be further applicable to provide power, supplemental power, emergency power, essential power, or the like, in otherwise non-emergency operations, such as takeoff, landing, or cruise flight operations.

Furthermore, it will be understood that aspects of the disclosure can be utilized, and has general application, to any electronic system wherein a number of smaller circuit blocks are connected by a data network, wherein the smaller circuit blocks provide a useful functionality, and can be programmed, initialized, or the like, as described herein. It will be understood that the illustrated aspects of the disclosure are only one non-limiting example of an aircraft, and many other possible aspects and configurations in addition to that shown are contemplated by the present disclosure. Additional non-limiting environments that can be applicable for aspects of the disclosure can include cars, ships, domestic housing, factories, speech recognition, temperature measurement, robotic machine control or operations, or any other system or spaces that include a controller module or microcontroller that performs a specific role determined by its electrical location and which must be assigned an appropriate network address for data communications for that position or location. Furthermore, while aspects of the disclosure are described with respect to a single controller module or microcontroller, the disclosure is equally applicable to environments that have a set of controller modules to perform the specific role or function. For example, an individual controller module can have a subset of microcontrollers or controller modules in the quantity of zero, one, or more than one, and wherein the subset of controller modules can be utilized for programming, identification, addressing, or the like, as described herein.

While "a set of" various elements will be described, it will be understood that "a set" can include any number of the respective elements, including only one element.

Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value. Additionally, while terms such as "voltage", "current", and "power" can be used herein, it will be evident to one skilled in the art that these terms can be interchangeable when describing aspects of the electrical circuit, or circuit operations.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Also as used herein, a controllable switching element, or a "switch" is an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

Aspects of the disclosure can be implemented in any electrical circuit environment having a switch. A non-limiting example of an electrical circuit environment that can include aspects of the disclosure can include an aircraft power system architecture, which enables production of electrical power from at least one spool of a turbine engine, preferably a gas turbine engine, and delivers the electrical power to a set of electrical loads via at least one solid state switch, such as a solid state power controller (SSPC) switching device. One non-limiting example of the SSPC can include a silicon carbide (SiC) or Gallium Nitride (GaN) based, high power switch. SiC or GaN can be selected based on their solid state material construction, their ability to handle high voltages and large power levels in smaller and lighter form factors, and their high speed switching ability to perform electrical operations very quickly. Additional switching devices or additional silicon-based power switches can be included.

The exemplary drawings are for purposes of illustration only and the dimensions, positions, order and relative sizes reflected in the drawings attached hereto can vary.

As illustrated in FIG. 1, an aircraft 10 is shown having at least one gas turbine engine, shown as a left engine system 12 and a right engine system 14. Alternatively, the power system can have fewer or additional engine systems. The left and right engine systems 12, 14 can be substantially identical, and can further include at least one power source, such as a first electric machine or a generator 18. The left and right engine systems 12, 14 can further include another power source, such as a second electric machine or generator 19. Non-limiting aspects of the disclosure can be included wherein, for example, the first generator 18 is a primary power source and the second generator is a secondary, back-up, or redundant power source. The aircraft is shown further having a set of power-consuming components, or electrical loads 20, such as for instance, an actuator load, flight critical loads, and non-flight critical loads.

The electrical loads 20 are electrically coupled with at least one of the generators 18, 19 via a power distribution system including, for instance, power transmission lines 21 or bus bars, and power distribution nodes 16. It will be understood that the illustrated aspects of the disclosure of FIG. 1 is only one non-limiting example of a power distribution system, and many other possible aspects and configurations in addition to that shown are contemplated by the present disclosure. Furthermore, the number of, and placement of, the various components depicted in FIG. 1 are also non-limiting examples of aspects associated with the disclosure.

In the aircraft 10, the operating left and right engine systems 12, 14 provide mechanical energy which can be extracted, typically via a spool, to provide a driving force for the set of generators 18, 19. The set of generators 18, 19, in turn, generate power, such as AC or DC power, and provides the generated power to the transmission lines 21, which delivers the power to the electrical loads 20, positioned throughout the aircraft 10. In one non-limiting aspect of the disclosure, at least one of the set of generators 18, 19 can include a variable frequency generator configured or selected to generate AC power.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. Additional management functions can be included. Furthermore, additional power sources for providing power to the electrical loads 20, such as emergency power sources, ram air turbine systems, generators, auxiliary power units (APUs), batteries, or the like, can be included, and can substitute for the power source.

Example power distribution management functions can include, but are not limited to, selectively enabling or disabling the delivery of power to particular electrical loads 20, by way of the operable connection, depending on, for example, available power distribution supply, criticality of electrical load 20 functionality, or aircraft mode of operation, such as take-off, cruise, or ground operations. During emergency or inadequate periods of electrical power generation, including but not limited to engine or generator failure, at least one additional power source can be operated, enabled, or connected for providing power to the electrical loads 20. Additional management functions can be included.

Furthermore, the number of, and placement of, the various components depicted in FIG. 1 are also non-limiting examples of aspects associated with the disclosure. For example, while various components have been illustrated with relative position of the aircraft (e.g. the electrical loads 20 on the wings of the aircraft 10, etc.), aspects of the disclosure are not so limited, and the components are not so limited based on their schematic depictions. Additional aircraft 10 configurations are envisioned.

Figure 2:
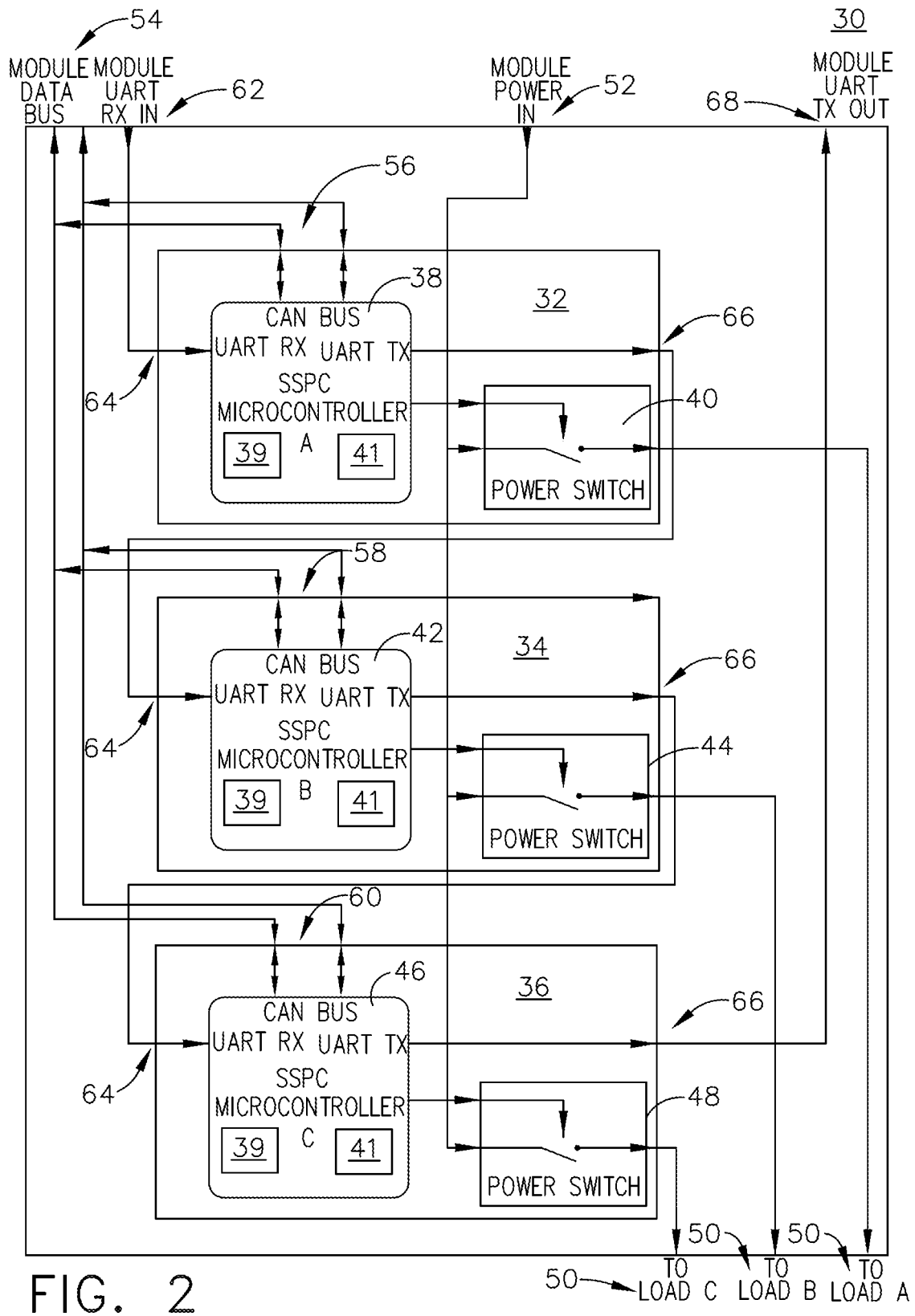
FIG. 2 is an example schematic view of the power distribution node of FIG. 1, in accordance with various aspects described herein.

FIG. 2 illustrates one non-limiting example of a power distribution node 30. The power distribution node 30 can include a set of switchable elements, such as SSPCs, shown as a first SSPC 32, a second SSPC 34, and a third SSPC 36. The first SSPC 32 can include a respective first controller module 38 having a processor 39 and memory 41, and a first power switch 40 communicatively connected with the first controller module 38. Similar to the first SSPC 32, the second SSPC 34 can include a second controller module 42 (for example, substantially similar to the first controller module 38) communicatively connected with a second power switch 44, and the third SSPC 36 can include a third controller module 46 (for example, substantially similar to the first controller module 38) communicatively connected with a third power switch 48.

The power distribution node 30 can be arranged, configured, or the like, to have a common power input 52 connected with each respective power switch 40, 44, 48, and wherein the power distribution node 30 can include a set of unique power outputs 50 connected with each respective power switch 40, 44, 48. During power distribution operations, the controller module 38, 42, 46 of the respective SSPC 32, 34, 36 can controllably operate or enable the switching of the respective power switch 40, 44, 48 to connect or disconnect the power output 50 with the common power input 52. In this sense, the power distribution node 30 can operably or effectively operate to energize or supply power to a set or subset of electrical loads connected with the set of power outputs of the power distribution node 30 by way of execution of a set of switching instructions or controls operated by the respective controller module 38, 42, 46 or another controlling component.

Non-limiting aspects of the power distribution node 30 can be included wherein, for example, each respective SSPC 32, 34, 36 or controller module 38, 42, 46 is communicatively connected with a common communication bus input 54. For example, the first SSPC 32 can include a first communication connection 56, the second SSPC 34 can include a second communication connection 58, and the third SSPC 36 can include a third communication connection 60, wherein each communication connection is connected with the common communication bus input 54 of the power distribution node 30. In one non-limiting aspect of the disclosure, the common communication bus can include a Controller Area Network (CAN) bus or RS-485, but additional communication buses or communication connections are envisioned. In one non-limiting aspect of the disclosure, the power distribution node 30 can receive control instructions communicated from a controller module (not shown) for the operation of the power distribution node 30. For instance, control instructions received at the common communication bus input 54 can include broadcast-type instructions that are equally received by each respective communication connection 56, 58, 60 of the respective SSPC 32, 34, 36 or controller module 38, 42, 46, and wherein the broadcast can include an addressing scheme such that only intended SSPCs 32, 34, 36 operate, respond, or execute the desired instruction. Non-limiting aspects of the disclosure can include unidirectional or bidirectional communications in any of the aforementioned or further described communication buses, ports, connectors, or the like. Further non-limiting aspects of the disclosure can be included wherein the set of SSPCs 32, 34, 36 are substantially alike in design or performance (e.g. current rating, electrical characteristics, or the like), or dissimilar (e.g. the first SSPC 32 includes current rating of 25 Amps while the second and third SSPC 34, 36 include a current rating of 50 Amps, each), as desired.

Non-limiting aspects of the power distribution node 30 can further include a specialized data input port 62 and a specialized data output port 68. As used herein, "specialized" data can include ports adapted or configured to receive supplementary data, non-operational data (e.g. data distinguished from the common communication bus input 54), or a combination thereof for switching operations of the power distribution node 30. For instance, specialized data can include, but is not limited to, programming data, identification data, initialization data, power-on or "boot-up" data, or the like. In one non-limiting example, the specialized data ports 62, 68 can be configured, adapted, or arranged to operate in accordance with a serial bus or universal asynchronous receiver/transmitter (UART) port or protocol. Additional or alternative port types or protocols are envisioned.

Further non-limiting aspects of the disclosure can be included wherein each respective SSPC 32, 34, 36 can include a respective SSPC specialized data input port 64 and a SSPC specialized data output port 66. In another non-limiting aspect of the disclosure, the respective SSPCs 32, 34, 36 can be arranged, connected, or the like, in a series or linear type arrangement by way of the respective specialized data ports 62, 64, 66, 68. For example, the SSPC specialized data input port 64 of the first SSPC 32 can be connected with the specialized data input port 62 of the power distribution node 30. The SSPC specialized data output port 66 of the first SSPC 32 can further be connected with the SSPC specialized data input port 64 of the second SSPC 34. The SSPC specialized data output port 66 of the second SSPC 34 can further be connected with the SSPC specialized data input port 64 of the next sequential SSPC. The final, or last sequential SSPC specialized data output port 66 can be further connected with the specialized data output port 68 of the power distribution node 30. In this sense, the set of SSPCs 32, 34, 36 can be linked in a continuous "daisy chain" or arranged in a linear or sequential "daisy chain" arrangement, via the SSPC specialized data ports 62, 64, 66, 68.

While three SSPCs 32, 34, 36 are illustrated, non-limiting aspects of the power distribution node 30 can include any number of switchable elements.

Figure 3:
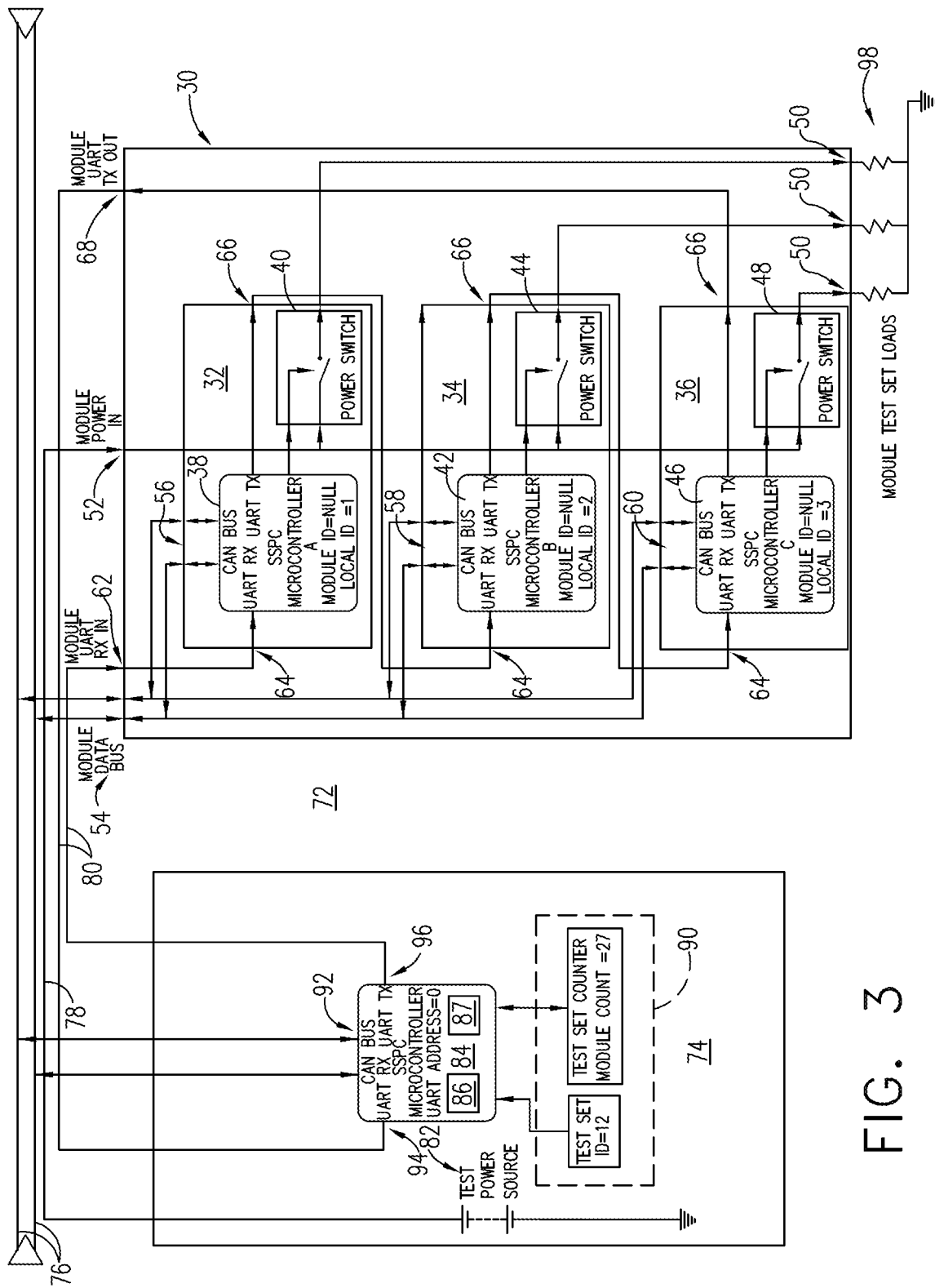
FIG. 3 is an example schematic view of a programming circuit for the power distribution node of FIG. 2, in accordance with various aspects described herein.

Turning now to FIG. 3, an example test or programming circuit 72 for programming operations of the power distribution node 30 is shown. In one non-limiting aspect, the programming circuit 72 can be applied, or the programming operations of the power distribution node 30 can occur during manufacturing, or prior to installation of the power distribution node 30 in the expected operating environment, such as the aircraft. As illustrated, the programming circuit 72 can include a programming module 74, further comprising a test or programming power source 82, and test or programming controller module 84 having a processor 86 and memory 87.

The programming power source 82 can be connected with a power bus 78. The programming controller module can further include a programming communication connection 92 connected with a communication bus 76 (such as a CAN bus), and a programming module specialized data input port 94 and a programming module specialized data output port 96. The programming module specialized data ports 94, 96 can be further connected with a specialized data bus 80. As shown, the power distribution node 30 can further be connected with the communication bus 76 by way of the common communication bus input 54, connected with the power bus 78 by way of the common power input 52, and connected with the specialized data bus 80 by way of the specialized data input port 62 (for instance, connected with the programming module specialized data output port 96) and the specialized data output port 68 (for instance, connected with the programming module specialized data input port 94).

The programming module 74 can further include a set of test or programming data 90, for example stored in memory 87 of the programming controller module 84. Illustrated schematically, the set of programming data 90 can include, but is not limited to, a Test Set ID value, a Module Count value, or a combination thereof. In another non-limiting aspect of the disclosure, the set of power distribution node power outputs 50 can be connected with a set of test loads 98.

Non-limiting aspects of the disclosure can be included wherein, for example, the set of SSPC controller modules 38, 42, 46 is capable of being enabled to receive new code or data by way of at least the SSPC specialized data input port 64, and store the code or data in memory, such as the controller module memory 41. Aspects of the disclosure can be included wherein the new code or data can include unique addressing information or data, such as the relative or physical location of the respective SSPC 32, 34, 36 in the power distribution unit 30. Additionally, aspects of the disclosure can be included wherein the unique addressing information or data is programmed, "burned-in", or the like, only once for each respective SSPC 32, 34, 36. In this sense, each SSPC 32, 34, 36 can receive a permanent identification relative to the power distribution node 30, by way of the programming circuit 72 or programming module 74 operations.

During programming operations, the set of SSPC controller modules 38, 42, 46 will be ready to receive the specialized data generated at the specialized data output port 96 of the programming module, and provided to the specialized data input port 62 of the power distribution node 30, via the specialized data bus 80. The first SSPC 32 or first controller module 38 will then receive the specialized data at the SSPC specialized data input port, from the specialized data input port of the power distribution node 30. The specialized data can include, but is not limited to, identifying data, such as a number, sequence of data, or the like. For example purposes, the first controller module 38 can receive specialized data indicating or identifying the number '0'.

In accordance with the programming operations, the first controller module 38 can be configured to operably increment the identifying number '0' to '1', which the first controller module 38 can then permanently store in memory as identifying data, such as a "local ID" value. The first controller module 38 can then be configured to transmit the identifying number '1' to the next SSPC 34 arranged in series by the linear arrangement of the specialized data ports 64, 66. In the illustrated example, the specialized data, including identifying number '1' is transmitted from the specialized data output port 66 of the first SSPC 32 to the specialized data input port 64 of the second SSPC 34 or second controller module 42. Similar to the programming operations of the first controller module 38, the second controller module 42 can be configured to operably increment the identifying number '1' to '2', which the second controller module 42 can then permanently store in memory as identifying data, such as a "local ID" value. The second controller module 42 can then be configured to transmit the identifying number '2' to the next SSPC 36 arranged in series by the linear arrangement of the specialized data ports 64, 66, so on and so on, until each in the set of SSPCs 32, 34, 36 have received and have been programmed with unique identifying data. At the end of the series of SSPCs 32, 34, 36, the final SSPC specialized data output port 66 can transmit the identifying number back to the specialized data input port 94 of the programming module 74, via the power distribution node specialized data output port 68 and the specialized data bus 80.

Non-limiting aspects of the disclosure can be included wherein, for example, the programming module 74 or the programming controller module 84 validates or verifies that the returned identifying number, specialized data, or the like, is in accordance with the expected programming or identifying of the power distribution node 30. Additionally, or alternatively, non-limiting aspects of the disclosure can be included wherein the programming circuit 72, programming module 74, or the like can further provide programming or further configuration of the set of SSPCs 32, 34, 36, for example, by way of the communication bus 76 or common communication bus input 54, once the set of SSPCs 32, 34, 36 have been programmed with the identifying data or specialized data. In this sense, the set of SSPCs 32, 34, 36 are identifiable or addressable by way of further communication connections, due to the identifying data or specialized data. In another non-limiting aspect of the disclosure, aspects of the programming circuit 72, the programming module 74, or the programming controller module 84 can be included wherein, for example, the programming circuit 72 can be configured to sense a failure of "timing out" of the specialized data transmissions, to determine if the power distribution node 30 (or a SSPC thereon) is defective. In yet another non-limiting aspect of the disclosure, the above-described process can be applied to a repaired power distribution node 30 and overwrite any stored identifying data or specialized data in a subsequent programming.

Non-limiting aspects of the disclosure can include additional information or data included in the identifying data or specialized data. For instance, in one non-limiting example, the identifying data or specialized data can further be encoded or include at least a subset of information from the programming data 90 (e.g. Test Set ID, Module count, or the like). In this sense, the set of SSPCs 32, 34, 36 can be further identified, not only relative to each other within the power distribution node 30, but with a unique set of identifying data or specialization data that is unique to each SSPC manufactured (e.g. unique in the world). Any number of addressing schemes can be included to provide each SSPC a unique identifier, specialized data, or the like.

Figure 4:
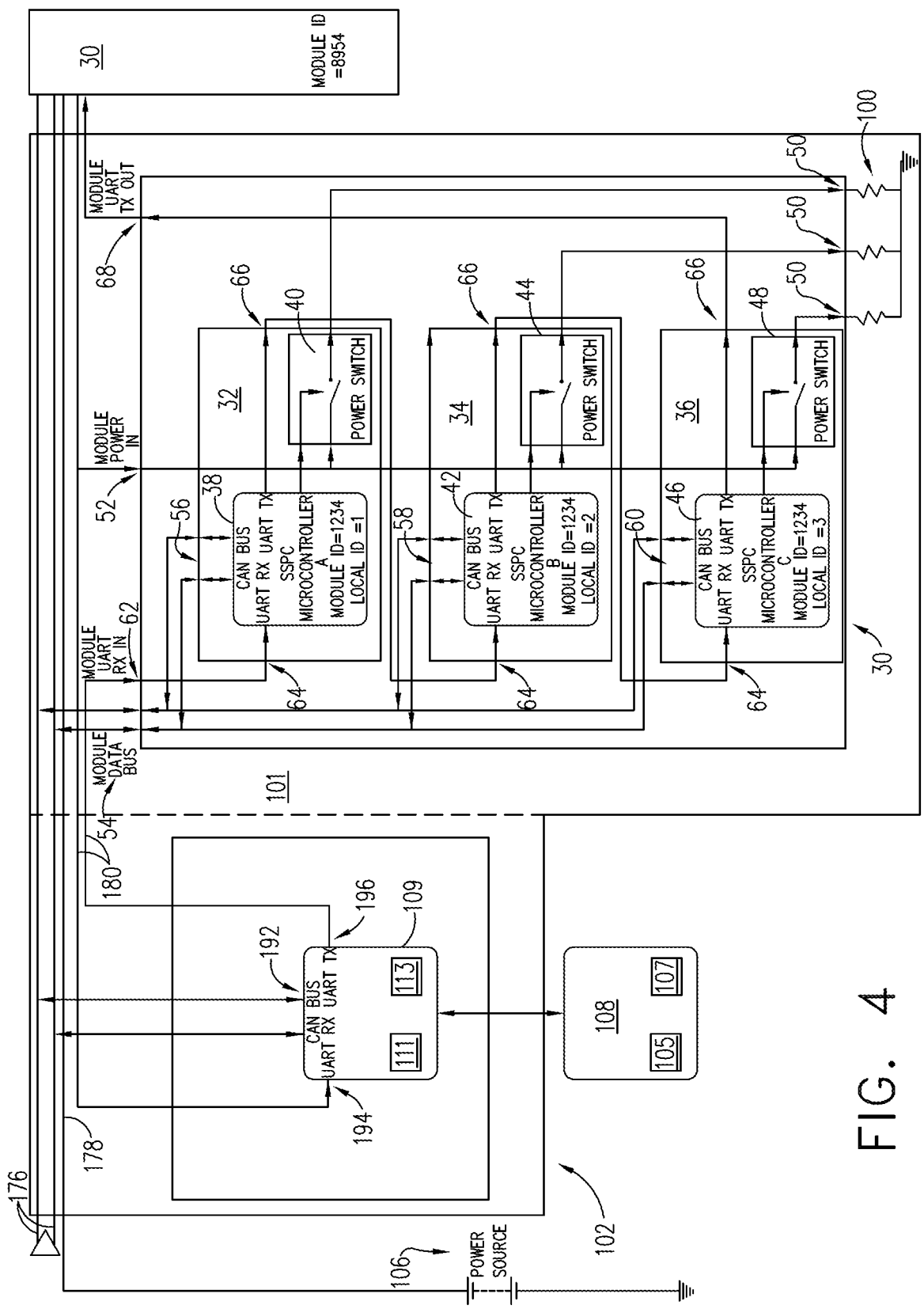
FIG. 4 is an example schematic of the power distribution system of FIG. 1, in accordance with various aspects described herein.

FIG. 4 illustrates a schematic example view of a set of power distribution nodes 30 in an "in situ" arrangement, that is, installed in a power distribution system 101. The power distribution system 101 can include similar inputs, outputs, busses and the like, as previously described, thus, like parts will be identified with like numerals increased by 100, with it being understood that the description of the like parts or numbers applies to power distribution system 101, unless otherwise noted.

As shown, the power distribution system 101 can include a system controller 102, including a system controller module 109. The system controller module 109 can include a processor 111 and memory 113, a communication connection 192, a specialized data input port 194, and a specialized data output port 196. The specialized data ports 194, 196 can be connected with a specialized data bus 180 and the communication connection 192 can be connected with a communication bus 176. Non-limiting aspects of the disclosure can be included wherein a power source 106 (such as a generator) is connected with a power bus 178. In another non-limiting aspect, the system controller 102, 109 can be further connected with, or controllable in response to communications from an external controller module 108, having a processor 105 and memory 107. In one non-limiting example, the external controller module 108 can control overall aspects of the power distribution system 101 while the system controller 102, 109 controls aspects of a subset of the power distribution nodes 30.

Each power distribution node 30 of the power distribution system 101 can be connected, respectively, with the communication bus 176 via the common communication bus input 54, with the power bus 178 via the common power input 52, and with the specialized data bus 180 via the specialized data input and output ports 62, 68. Each of the set of outputs 50 can be connected with a respective energizable electrical load, illustrated schematically as resistors 100. Non-limiting aspects of the power distribution system 101 can assume the set of SSPCs 32, 34, 36 have been previously programmed with an addressable location, identifying information or data, or at least a subset of specialized data, as described with respect to FIG. 3.

Aspects of FIG. 4 can be utilized for referencing, further programming, further identifying, or the like, the set of power distribution nodes 30, set of SSPCs 32, 34, 36, or the like, in the power distribution system 101. For example, in an aircraft, tens or hundreds of power distribution nodes 30, or hundreds or thousands of SSPCs 32, 34, 36 can be utilized for selective energizing of the electrical loads. Aspects described herein can be used to validate or verify the set of SSPCs 32, 34, 36 or power distribution nodes 30, as well as identify or provide addressing of the like. In one non-limiting example, the validating, verifying, identifying, addressing, or the like can occur during a start-up process, boot-up process, initialization process, initialization process, or the like, or after maintenance operations, such as when an SSPC or power distribution node is replaced or fixed.

In one non-limiting aspect, during a respective start-up process, boot-up process, initialization process, initialization process, or the like, each SSPC 32, 34, 36 can be configured to await a specialized data message at its respective SSPC specialized data input port 64. The system controller 102 or system controller module 109 can then generate and transmit a specialized data message at the specialized data output port 196 to be delivered to the first SSPC 32 in the daisy-chained sequence, via the specialized data bus 180 and specialized data input port 62, as explained herein. In one non-limiting aspect, the specialized data message can include a first discovery message. The discovery message can, for example, operably cause the respective power distribution node 30 to send or transmit a power distribution node identifier or identifying value (e.g. a "module ID" is shown) onto the communication bus 176, which can then be recorded by the system controller 102, 109. It is understood that non-limiting aspects of the disclosure can be included wherein, at this point in the sequence of events, the SSPCs 32, 34, 36 have not necessarily been assigned individual labels, addresses, unique identifiers, or the like (for addressing purposes), which can be required for operational or functional message transmissions via the communication bus 176. For instance, this initial or discovery message can be sent or transmitted using a common preassigned address or label that is "universal" to all of the SSPCs 32, 34, 36, power distribution nodes 30, controller modules, or a combination thereof. This usage of universal address or label may not conform to some of the "normal" communication bus 176 data protocols, and can be confined to this initial discovery phase. Additional non-limiting aspects of the discovery message can be included.

The first discovery message can proceed through the daisy-chaining of the set of SSPCs 32, 34, 36, until the last in the sequence outputs the first discovery message to the specialized data output port 68 of the power distribution node 30 to the specialized data input port 62 of the next sequential power distribution node 30. The next sequential power distribution node 30 then broadcasts its own power distribution node identifier or identifying value onto the communication bus 176, which is then recorded by the system controller 102, 109. The sequence continues until the last power distribution node 30 in the power distribution system 101 returns the specialized data or first discovery message back to the specialized data input port 194 of the system controller 102, 109.

Aspects of the disclosure can be included wherein, the sequencing of the broadcasts by each respective power distribution node 30 is controllably such that, or to ensure that, the broadcasts of the power distribution nodes 30 do not overlap on the communication bus 176.

At this time, the system controller 102, 109 now has a log, list, table, or data for the set of the connected power distribution nodes 30. In non-limiting examples, the system controller 102, 109 can determine an order of the connected set of power distribution nodes 30, and can assign one or more additional addressable identifiers to each respective node 30. As used here, "additional addressable identifiers" means addressable identifiers beyond or not including the earlier-described identifying data included as part of the specialized data. The system controller 102 or the system controller module 109 can then generate or transmit a second specialized data message, including at least a set or series of data bus allocation messages by way of the communication bus 176 of the specialized data bus 180. The second specialized data message can include the one or more additional identifying values for the power distribution node 30 based on the order of the power distribution node 30 in the sequence or series of nodes 30. For instance, the first power distribution node 30 that receives the earlier-described discovery message will be the first to broadcast the power distribution node identifier or identifying value onto the communication bus 176, and thus, the first broadcast received and recorded by the system controller 102, 109 will be the "closest" power distribution node. The second broadcasting power distribution node 30 will be the next-closest node 30, and so on.

The second specialized data message can thus assign another identifying value based on the respective sequence of the power distribution nodes 30, for example, identifying the closest node 30 as '10', the second closest node as '20', and so on. In this manner, the system controller 102, 109 can further assign identifying values, for example, used in the addressing of commanding or controlling instructions, at the time of start-up or initialization. In one non-limiting aspect, commanding or controlling instructions to operate respective SSPCs 32, 34, 36 can be addressable by way of the power distribution node identifying value (e.g. "10") and the SSPC identifying value (e.g. "2"; the second SSPC 34 of the first power distribution node 30 in the sequence). Non-limiting aspects of the disclosure can further be included wherein, for example, the system controller module 109, in response to the sequence or series of nodes 30. For example, further assignment of one or more labels or addresses can be organized, applied, tabulated, or otherwise assigned and recorded for the respective set of nodes 30. The assignments can further be communicated to, for example, the external controller module 108.

It will be understood that non-limiting aspects of the disclosure can include methods, processes, data structures, and the like, (e.g. other than timing of the response order) for determining the physical sequence could be preferred and optionally can be used, alone, or in combination, to provide a cross-checking, validation, verification, or the like, functionality. For instance, in one non-limiting example, the first discovery message could include a counter data field, initialized to communicate an identifier (e.g. "zero") by the system controller module 109, and incremented by one as it passes through each respective controller module 38, 42, 46, SSPC 32, 34, 36, or the like. Thus, by including a copy of the local value of this field received by the respective controller module 38, 42, 46, SSPC 32, 34, 36, or the like, in each respective broadcast message recorded by the system controller module 109, the system controller module 109 can determine the physical location in the chain of each controller. This method has the advantage of guaranteed immunity of the order of messages being received by the system controller, possibly due to an automatic resend functionality, transmission priority protocols, transmission errors, or the like.

In another non-limiting example, the respective start-up process, boot-up process, initialization process, or the like can include a fault-recovery process. For example, during the initialization process described herein, if one of the power distribution nodes 30 in the sequence of nodes 30 did not respond, timed out, or otherwise did not reply to the discovery message as intended, expected, desired, or the like, the subsequent power distribution nodes 30 in the sequence can still report their respective presence in a broadcast message, as described. In one non-limiting example, a power distribution node 30 can fail to respond due to a fault, error, or another otherwise unexpected operation. In this example, the system controller module 109 can still operably log or receive the broadcast messages by the operational or non-functional controller module 38, 42, 46, SSPC 32, 34, 36, or the like.

In another non-limiting example, the respective start-up process, boot-up process, initialization process, or the like can operably pass over or "skip" a power distribution node 30 that has failed to otherwise respond. For example, a set of power distribution nodes 30 can be configured to operably listen for the broadcast responses from other power distribution nodes 30 while they await their specialized data to be received. In the event that a power distribution node 30 fails to broadcast a response (e.g. the node 30 has failed in some way), a downstream power distribution node 30 (relative to the sequence or chain) can monitor the communication bus 176 (for other broadcast responses from nodes 30), and upon satisfying a time-out value (while also not receiving the discovery message), broadcast its own broadcast message including a time-out indicator. The out-of-sequence broadcast message including the time-out indicator can be received, recorded, or the like, by the system controller module 109, which can further negotiate a "restart" message over the communication bus 176 to restart, redistribute, or otherwise initiate another discovery message which the downstream power distribution nodes 30 can respond to, and is passed through each respective controller module 38, 42, 46, SSPC 32, 34, 36, or the like, as described herein. The system controller module 109 can log or record the timed-out or not responding power distribution node 30 with an error indicator, or the like, and operably disable the operation of the non-responsive node 30. Non-limiting aspects of this example can be included wherein the set of power distribution nodes 30 can vary their broadcast time-out values (e.g. by randomization, sequentially organized value, etc.) to ensure that no message collisions occur on the communication bus 176 when downstream nodes 30 restart the discovery message. Another non-limiting aspect of this example can be included wherein the set of power distribution nodes 30 can vary their broadcast time-out values to minimize a probability of collision, for example, in combination with collision detection and retry or resending the discovery message operations, as described.

In a non-limiting example, the described operation would allow or enable the power distribution system to generally operate without the faulted power distribution node 30, and would minimize the number of non-operational power distribution nodes 30, SSPCs 32, 34, 36, or the like, without disrupting the entire power distribution system.

Figure 5:
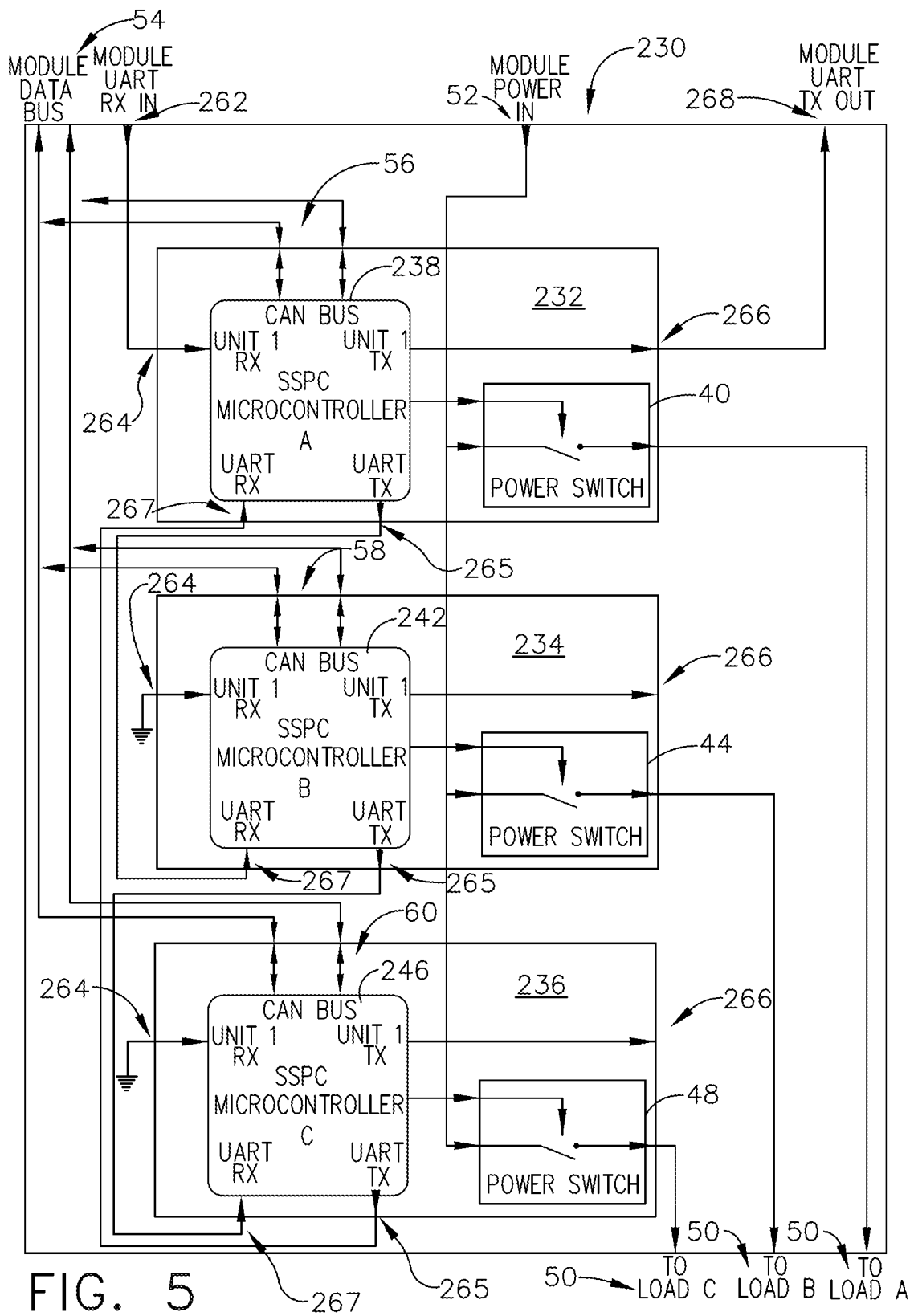
FIG. 5 is another example schematic view of the power distribution node of FIG. 1, in accordance with various aspects described herein.

FIG. 5 illustrates another power distribution node 230 according to another aspect of the present disclosure. The power distribution node 230 is similar to the power distribution node 30; therefore, like parts will be identified with like numerals increased by 200, with it being understood that the description of the like parts of the power distribution node 30 applies to the power distribution node 230, unless otherwise noted. One difference is that the set of SSPCs 232, 234, 236 can include multiple specialized data input and output ports. For instance, each respective SSPC 232, 234, 236 can include a first specialized data input port 264 and a second specialized data input port 267, and a first specialized data output port 266 and a second specialized data output port 265.

As shown, the first SSPC 232 in the sequence can have the first specialized data input port 264 connected with the specialized data input port 262 of the power distribution node 230, and configured to receive the aforementioned specialized data messages or signals. The first SSPC 232 in the sequence can further have the first specialized data output port 266 connected with the specialized data output port 268 of the power distribution node 230, and configured to transmit or carry forward the aforementioned specialized data messages or signals to the next node or back to the originating node or module. The first SSPC 232 in the sequence can also have the second specialized data output port 265 connected with the second specialized data input port 267 of the next sequential SSPC 234, and configured to transmit or carry forward the aforementioned specialized data messages or signals to the next sequential SSPC 234. The second specialized data output port 265 of the final SSPC 236 in the sequence can be connected with the second specialized data input port 267 of the first sequential SSPC 232. In this sense, at least a portion of the specialized data can be received at the first sequential SSPC 232, and carried forward to the next node or module, while at least a portion of the specialized data can be daisy-chained or sequentially transmitted within the power distribution node 30 simultaneously.

Figure 6:
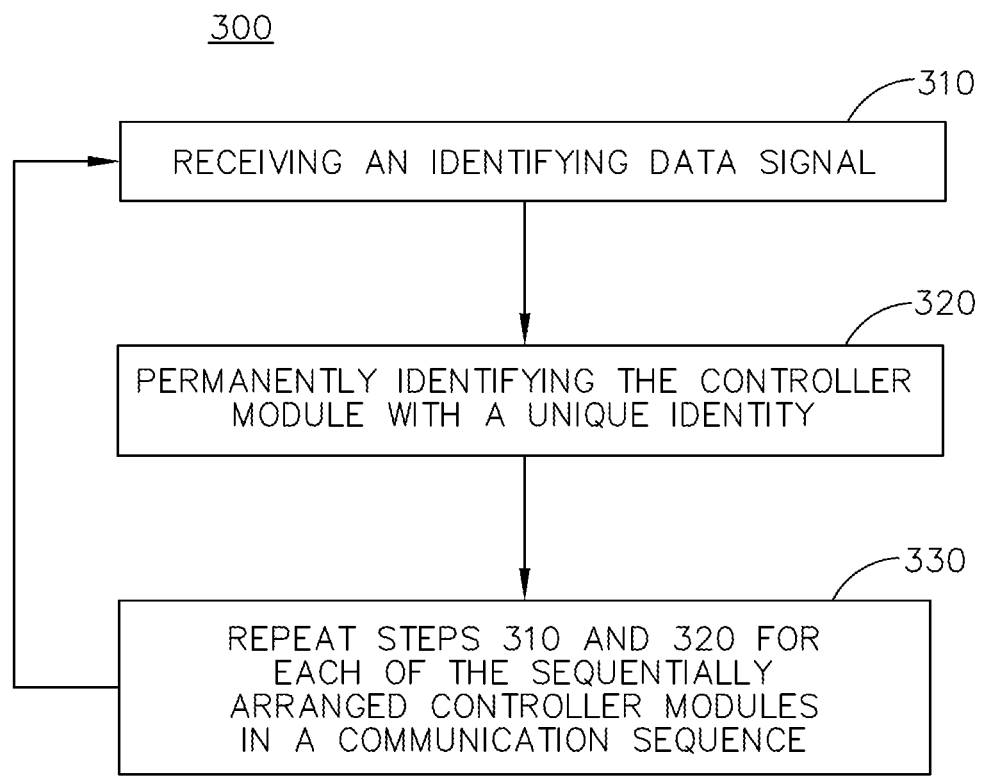
FIG. 6 is an example a flow chart diagram demonstrating a method of associating a permanent identity with set of power switches in accordance with various aspects described herein.

FIG. 6 illustrates a flow chart demonstrating a method 300 of associating a permanent identity with a set of power switches, as described with respect to FIG. 3. The method 300 begins by receiving an identifying data signal, including but not limited to the specialization data to a communications input of a power distribution node 30, 230 having the set of power switches 40, 44, 48 and a respective set of controller modules 38, 42, 46, 238, 242, 246 arranged in a communication sequence, at 310. In one non-limiting example, the communication sequence can be arranged by way of the programming module specialized data input and output ports 94, 96 and SSPC specialized data input and output ports 264, 265, 266, 267. The method 300 can further include supplying the identifying data signal to one of the set of controller modules 38, 42, 46, 238, 242, 246. Next, the method 300 permanently identifies the one of the set of controller modules 38, 42, 46, 238, 242, 246 with a unique identity at 320. The method 300 can then repeat at least the receiving step at 310 and the permanently identifying step at 320 for each successive and sequential SSPC, power switch, or controller module in the communications sequence, at 330.

Additional non-limiting aspects of the method 300 can include, for example, further incrementing or iterating the identifying data signal prior to permanently identifying the next of the set of controller modules 38, 42, 46, 238, 242, 246. In yet another example, the identifying data signal can be used for generating the unique identity. In yet another non-limiting aspect, after completing the repeating of step 330, further programming the set of power switches 40, 44, 48 or controller modules 38, 42, 46, 238, 242, 246 by way of a common communication bus, such as the communication bus 76, by addressing the set of power switches 40, 44, 48 or controller modules 38, 42, 46, 238, 242, 246 by their respective unique identity.

Figure 7:
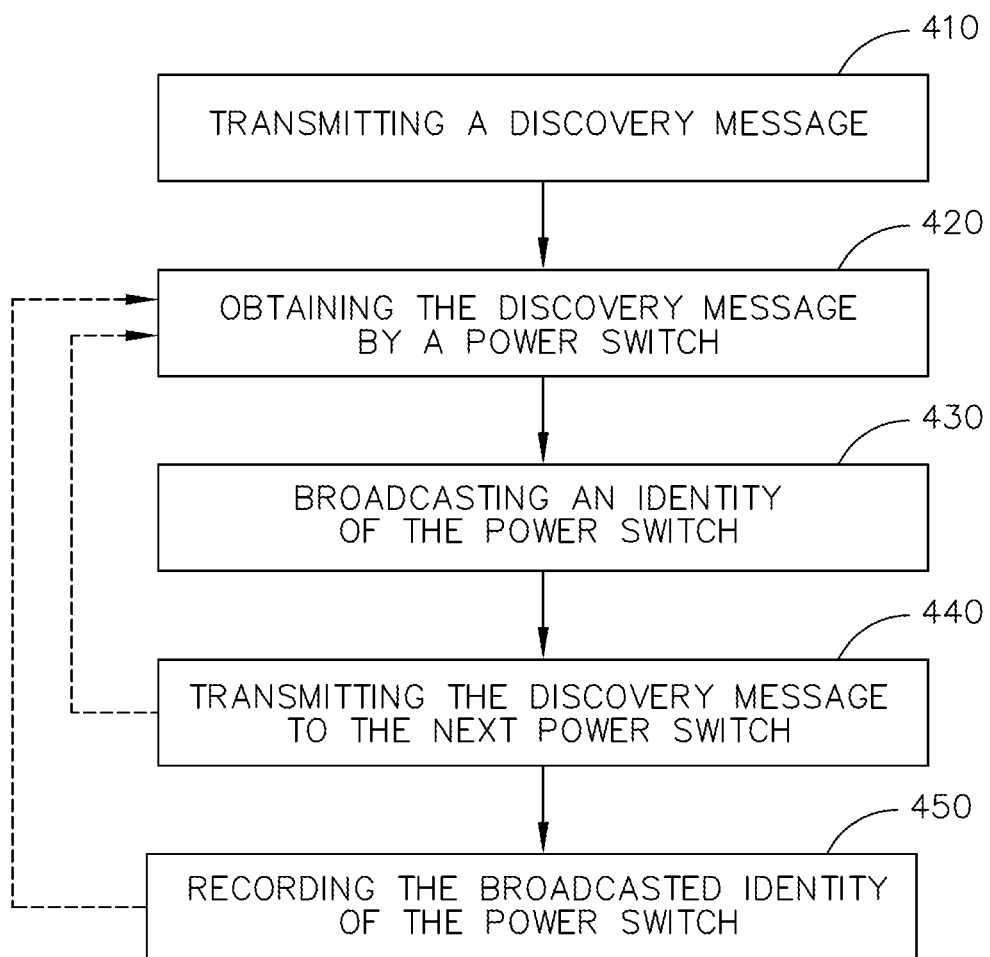
FIG. 7 is an example a flow chart diagram demonstrating a method of initializing a set of power switches in a power distribution system in accordance with various aspects described herein.

FIG. 7 illustrates a flow chart demonstrating a method 400 of initializing a set of power switches in a power distribution system, as described with respect to FIG. 4. The method 400 begins by transmitting, by a system controller module 102, 109 a discovery message on a non-addressable and sequentially arranged data pathway, to the set of power switches 40, 44, 48 or controller modules 38, 42, 46, 238, 242, 246, at 410. In one non-limiting example, the non-addressable and sequentially arranged data pathway can be arranged by way of the system controller specialized data input and output ports 194, 196, and SSPC specialized data input and output ports 264, 265, 266, 267. Next, the method 400 includes obtaining, by a first power switch (for example, the first SSPC 32, 232 or the first controller module 38, 238) in the data pathway sequence, the discovery message, at 420.

The method 400 can then broadcast on an addressable data bus, such as the communication bus 176, by the SSPC controller module 38, 42, 46, 238, 242, 246, an identity of the power switch, at 430. The method 400 can further include transmitting, by the first power switch (for example, the first SSPC 32, 232 or the first controller module 38, 238), the discovery message to the next power switch in the data pathway sequence (for example, the second SSPC 34, 234 or the second controller module 42, 242), at 440. In one non-limiting example, the discovery message can be modified in a predefined manner (e.g. incrementing a counter), as explained above. During the broadcasting, the method 400 can include recording, by the system controller module 102, 109, the broadcasted identity of the power switch, at 450. The method can then repeat the obtaining at 420, the broadcasting at 430, the transmitting at 440, or the recording at 450 until the sequentially arranged data pathway has been completed.

The sequences depicted is for illustrative purposes only and is not meant to limit the methods 300, 400 in any way as it is understood that the portions of the method can proceed in a different logical order, additional or intervening portions can be included, or described portions of the method can be divided into multiple portions, or described portions of the method can be omitted without detracting from the described method.

Many other possible aspects, configurations, or the like, in addition to that shown in the above figures are contemplated by the present disclosure. Additionally, the design and placement of the various components can be rearranged such that a number of different in-line configurations could be realized. For instance, the power distribution node 30 of FIG. 2 or the power distribution node 230 of FIG. 5 can be equally applicable to the disclosure and methods described herein.

The aspects disclosed herein provide an apparatus and method for programming, identifying, initializing, or the like, a power distribution node having a set of power switches. The technical effect is that the above described aspects enable the programming, identifying, initializing, or the like, a power distribution node having a set of power switches. One advantage that can be realized in the above aspects is that the above described aspects provide for programming or identification of a number of power distribution node SSPCs or power switches with an identity, which can be further utilized for addressable instructions on a broadcast-type communication bus. The described power distribution nodes can be sequentially programmed or identified by the sequential communication pathway without having to establish, individually, or independently programming identifying information by way of manual procedures. In large power distribution nodes, tens or hundreds of SSPCs can be included on each node, saving time and effort from an otherwise manual activity with minimal manual intervention.

Yet another advantage of the disclosure is that at least a portion of identifying information for at least one of the power distribution node or the SSPCs can be determined during an boot-up, initialization, or reinitialization period, wherein the power distribution system can scan and identify the components thereof. In this sense, when components have been repaired, replaced, reconfigured, or the like, the power distribution system can operably re-identify and reconfigure the associations or control schema appropriately. Again, the reconfigure can occur with minimal manual intervention, saving time and effort.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power distribution node comprising:
 a node communication input port and a node communication output port; and
 a set of sequentially-arranged power controllers having a corresponding set of communication input ports and communication output ports, the set of power controllers comprising at least:
  a first power controller having at least a first communication input port connected with the node communication input port, a first communication output port connected with the node communication output port, a second communication input port, and a second communication output port; and
  a second power controller having at least a second communication input port connected with the second communication output port of the first power controller, and a second communication output port connected with the second communication input port of the first power controller;
 wherein the first and second power controllers are adapted to be identified with a permanent identity by way of a transmittable data signal receivable at the node communication input port;
 wherein the set of communication input ports and communication output ports are arranged such that the transmittable data signal receivable at the node communication input port is received by the second power controller and returned to the first power controller, whereby it is transmittable to the node communication output port.

2. The power distribution node of claim 1, wherein the set of power controllers are sequentially arranged by connecting a respective communication output port of one power controller to a respective communication input port of an adjacent power controller.

3. The power distribution node of claim 2 wherein the communication output port of the last of the set of sequentially arranged power controllers is connected with the node communication output port.

4. The power distribution node of claim 2 wherein the set of power controllers are sequentially arranged in a daisy chain.

5. The power distribution node of claim 1 wherein at least one of the first power controller or the second power controller includes a solid-state power controller.

6. The power distribution node of claim 1 further comprising a communication data bus connected with the first and second power controller, and adapted to receive a power distribution node instruction signal.

7. The power distribution node of claim 6, wherein the first and second power controllers are addressable via instruction signal by way of the permanent identity.

8. The power distribution node of claim 1 wherein the transmittable data signal includes a unique identifying value related to the permanent identity.

9. The power distribution node of claim 8 wherein the unique identifying value is incremented by at least one of the first or second-power controllers prior to subsequent transmittal of the data signal.

10. The power distribution node of claim 1 wherein the permanent identity is unique to the power distribution node.

11. A method of associating a permanent identity with a set of power switches, the method comprising:
 A) receiving an identifying data signal to a communications input of a power distribution node including the set of power switches and respective set of controller modules arranged in a communication sequence;
 B) supplying the identifying data signal to one of the set of controller modules;
 C) permanently identifying the one of the set of controller modules with a unique identity;
 D) repeating steps B) and C) sequentially in the next of the set of controller modules in the communication sequence; and
 E) transmitting the identifying data signal from a second controller module in the set of controller modules to the one of the set of controller modules and to a communications output of the power distribution node.

12. The method of claim 11 further comprising iterating the identifying data signal prior to permanently identifying the next of the set of controller modules.

13. The method of claim 12 wherein the identifying data signal is used for generating the unique identity.

14. The method of claim 11, wherein, after completing repeating, further programming the set of power switches by way of a common communication bus by addressing the set of power switches by their respective unique identity.

15. A power distribution node programming assembly comprising:
 a node communication input port, and a node communication output port;
 a power distribution node having a set of power controllers, each power controller including a switch controller module having a set of communication input ports and a set of communication output ports, wherein the set of power controllers are sequentially arranged such that the node communication input port is connected with the first of the sequentially: arranged switch controller modules, and one of the set of communication input ports of each successive switch controller module is connected with one of the set of communication output ports of the preceding switch controller module, and wherein one of the set of communication output ports of the last of the sequentially: arranged switch controller modules is connected with the node communication output port and with one of the set of second communication input ports of the first of the sequentially-arranged switch controller modules; and
 a programming controller module configured to generate a programming data signal supplied to the node communication input port, wherein the programming data signal is configured to sequentially identify each of the set of power controllers with a permanent identity, and wherein the set of communication input ports and the set of communication output ports are arranged such that the programming data signal is returned to the first of the sequentially-arranged switch controller modules, whereby it is transmittable to the node communication output port.

16. The power distribution node programming assembly of claim 15 wherein the programming data signal includes a unique identifying value related to the permanent identity.

17. The power distribution node programming assembly of claim 16 wherein the unique identifying value is iterated prior to identifying the sequentially next of the set of power controllers with a permanent identity.

18. The power distribution node programming assembly of claim 15 wherein the permanent identity is unique to the power distribution node.

* * * * *